(12) United States Patent
Chen et al.

(10) Patent No.: US 7,639,483 B2
(45) Date of Patent: Dec. 29, 2009

(54) FLAT PANEL DISPLAY HAVING PIVOT STRUCTURE

(75) Inventors: Yung-Hsiang Chen, Miao-Li (TW);
Che-Min Huang, Miao-Li (TW);
Meng-Tse Tsai, Miao-Li (TW);
Hsiao-Yuan Ho, Miao-Li (TW);
Chien-Tung Chu, Miao-Li (TW);
Lan-Shih Chou, Miao-Li (TW); Te-Hsu Wang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 148 days.

(21) Appl. No.: 11/825,983

(22) Filed: Jul. 9, 2007

(65) Prior Publication Data

US 2008/0007904 A1    Jan. 10, 2008

(30) Foreign Application Priority Data

Jul. 7, 2006    (TW) ............................... 95124919 A (51) Int. Cl.
*H05K 7/16* (2006.01)
(52) U.S. Cl. .................................. 361/679.22; 248/923

(58) Field of Classification Search .................. 361/681, 361/679.22; 248/923
See application file for complete search history.

(56) References Cited

U.S. PATENT DOCUMENTS

| 7,061,753 B2 * | 6/2006 | Michoux et al. ............ 361/681 |
| 7,068,497 B2 | 6/2006 | Chu |
| 2008/0007904 A1 * | 1/2008 | Chen et al. .................. 361/681 |

* cited by examiner

*Primary Examiner*—Jayprakash N Gandhi
*Assistant Examiner*—Ingrid Wright
(74) *Attorney, Agent, or Firm*—Wei Te Chung (57) ABSTRACT

An exemplary flat panel display (1) includes a display body (2), a neck (4), and at least one foot (6). The display body includes a back cover (20). The back cover includes a protruding portion (201), and a recessed portion (203) adjacent to the protruding portion. The neck is connected with the display body by a pivot (41), and corresponds to the recessed portion. The at least one foot is connected with the neck by a pivot assembly (42). The at least one foot supports the neck and the display body, and corresponds to the protruding portion. When the flat panel display is folded up, the neck is at least partially accommodated in the recessed portion, and the at least one foot is positioned a peripheral edge of the protruding portion.

15 Claims, 7 Drawing Sheets

FLAT PANEL DISPLAY HAVING PIVOT STRUCTURE

FIELD OF THE INVENTION

The present invention relates to a flat panel display (FPD) having a pivot structure, the pivot structure being configured so that the flat panel display can be folded up into a compact shape.

GENERAL BACKGROUND

Figure 7:
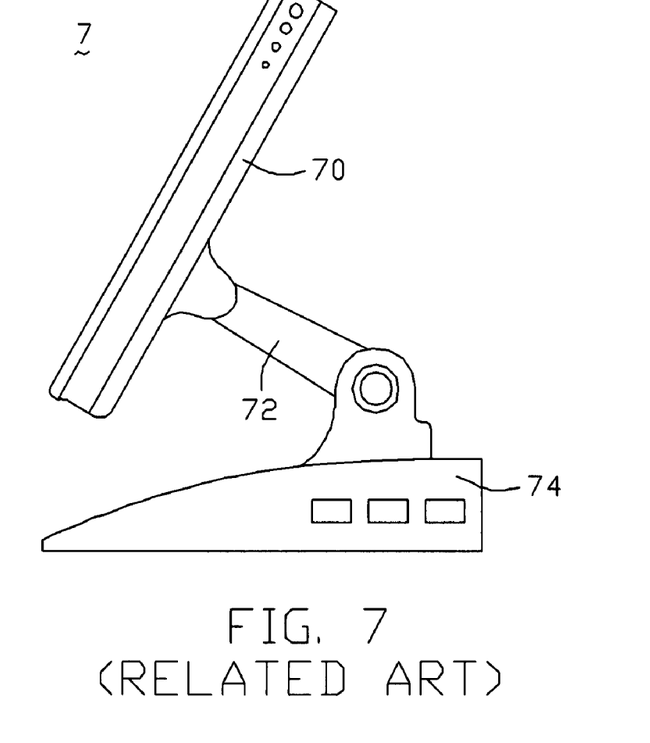
FIG. 7 is a side view of a conventional flat panel display.

Flat panel displays are commonly used as display devices for compact electronic apparatuses. Referring to FIG. 7, a typical flat panel display 7 includes a display body 70, a neck 72, and a base 74. The neck 72 is connected with the display body 70 by a first pivot structure (not labeled), and is further connected with the base 74 by a second pivot structure (not labeled). The display body 70 and the neck 72 are supported by the base 74.

Figure 8:
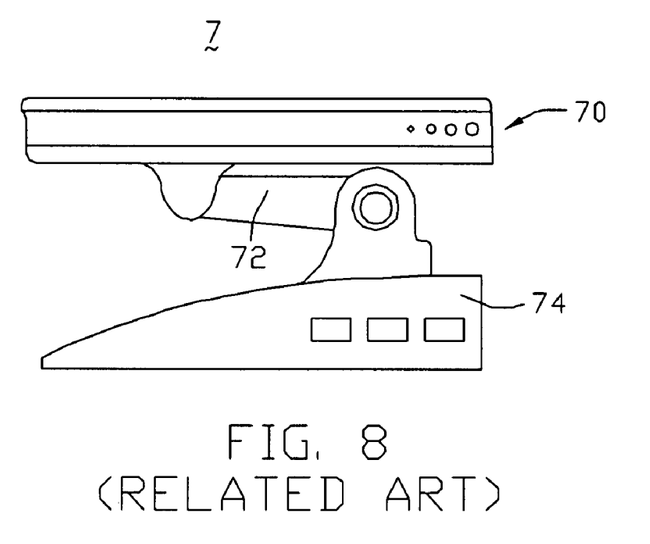
FIG. 8 is similar to FIG. 7, but showing the flat panel display folded into a compact shape.

Referring also to FIG. 8, when the flat panel display 7 is folded, a topmost extremity (not labeled) of the second pivot structure is adjacent to a flat back side (not labeled) of the display body 70, and the back side of the display body 70 is essentially parallel to a bottom (not labeled) of the base 74. Thus, a distance between the display body 70 and the base 74 is reduced. However, the shortness of the distance between the display body 70 and the base 74 is restricted by the size of the second pivot structure itself. Therefore, the flat panel display 7 cannot achieve a very compact shape when it is folded. Furthermore, this limitation makes it difficult to economize on the cost of packaging and transporting the flat panel display 7.

What is needed, therefore, is a flat panel display that can overcome the above-described deficiencies.

SUMMARY

In an exemplary embodiment, a flat panel display includes a display body, a neck, and at least one foot. The display body includes a back cover. The back cover includes a protruding portion, and a recessed portion adjacent to the protruding portion. The neck is connected with the display body by a pivot, and corresponds to the recessed portion. The at least one foot is connected with the neck by a pivot assembly. The at least one foot supports the neck and the display body, and corresponds to the protruding portion. When the flat panel display is folded up, the neck is at least partially accommodated in the recessed portion, and the at least one foot is positioned a peripheral edge of the protruding portion.

Other novel features, advantages and aspects will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments in detail.

Figure 1:
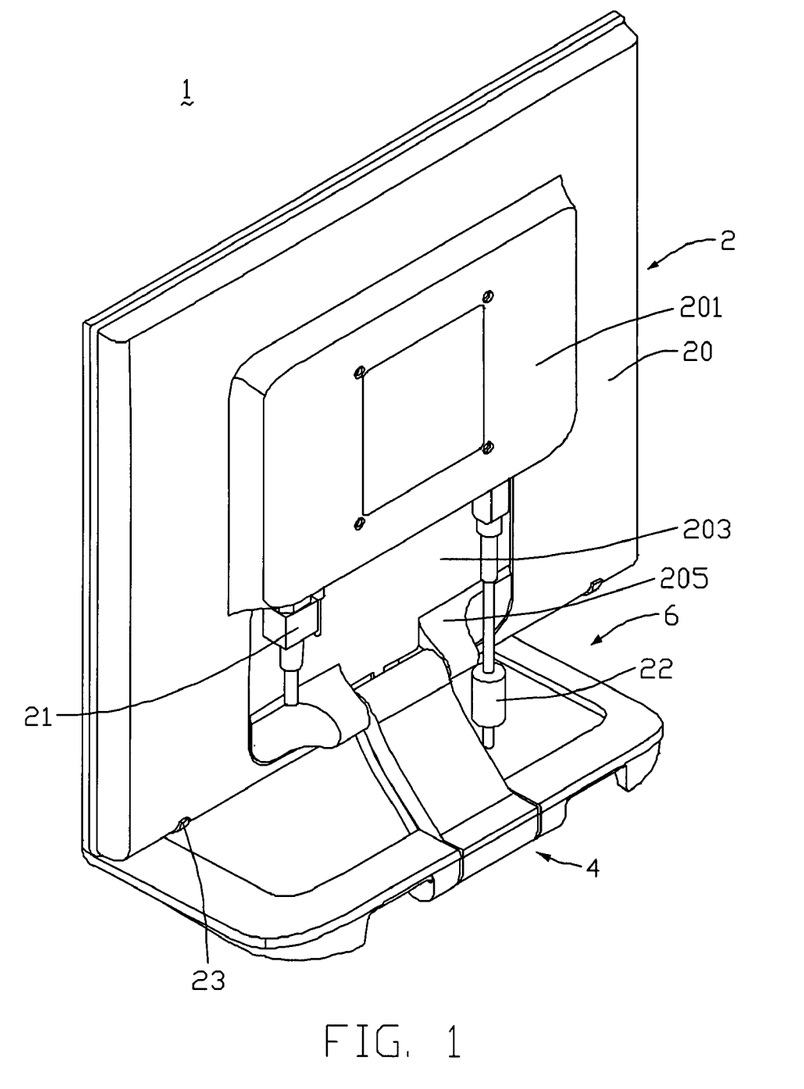
FIG. 1 is an isometric, back view of a flat panel display according to an exemplary embodiment of the present invention, the flat panel display including a display body, a neck connected with the display body, and a pair of feet supporting the neck and the display body, the display body shown oriented at a first angle for viewing.

Referring to FIG. 1, a flat panel display 1 according to an exemplary embodiment of the present invention is shown. The flat panel display 1 includes a display body 2, a neck 4, and a pair of feet 6. The neck 4 pivotally interconnects the display body 2 and the feet 6.

The display body 2 includes a front frame (not labeled), a display module (not shown), a back cover 20, a first data cable 21, a second data cable 22, and two antiskid blocks 23. The front frame and the back cover 20 cooperatively accommodate the display module and other components (not shown) of the display body 2.

The back cover 20 includes an upper protruding portion 201, a lower recessed portion 203 adjacent to the protruding portion 201, and a pair of opposite connection arms 205 located in a bottom of the recessed portion 203 and protruding out therefrom. A printed circuit board (PCB, not visible) is received in the protruding portion 201. The protruding portion 201 defines two openings (not visible) in a bottom side thereof. The first data cable 21 and the second data cable 22 respectively extend through the openings, and are connected to the PCB. The antiskid blocks 23 are located at a bottom side of the back cover 20, and are respectively adjacent to two opposite vertical edges of the back cover 20.

Figure 2:
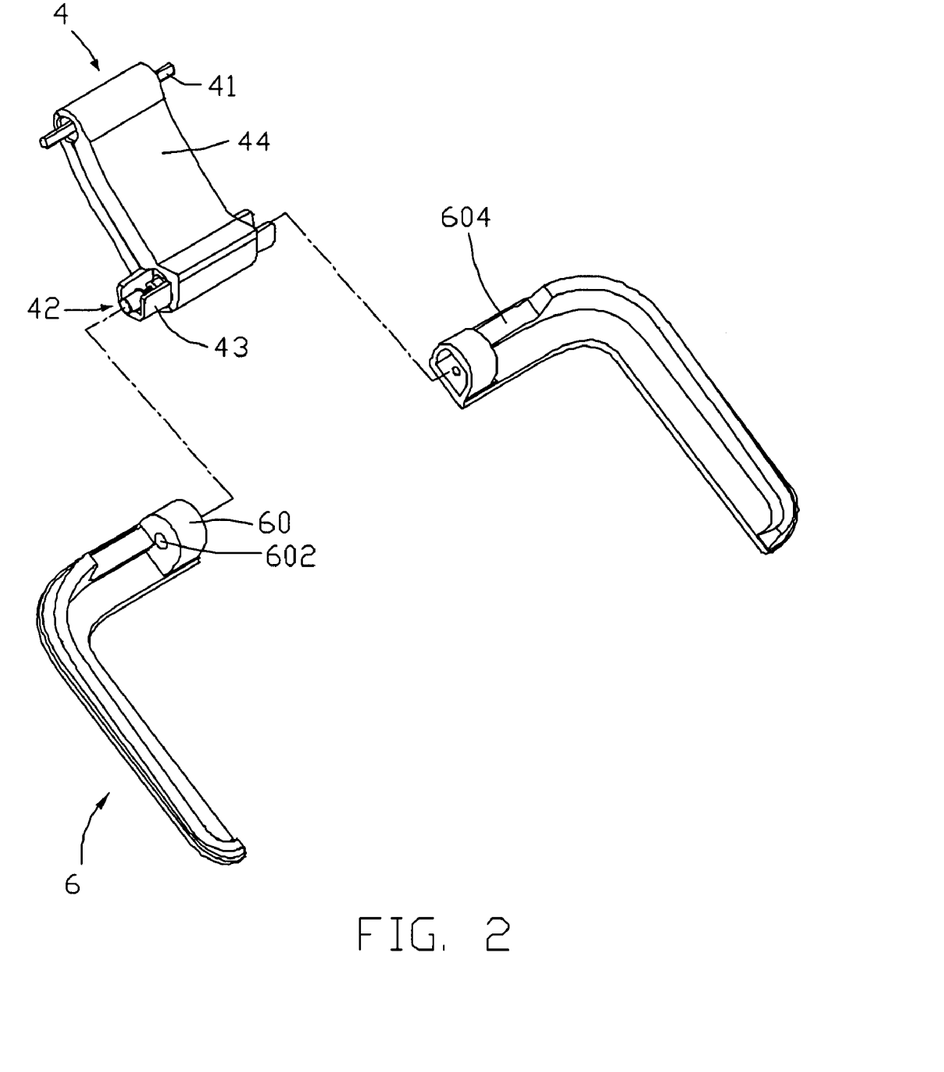
FIG. 2 is an exploded, isometric view of the neck and feet of the flat panel display of FIG. 1, the neck including a housing.
Figure 3:
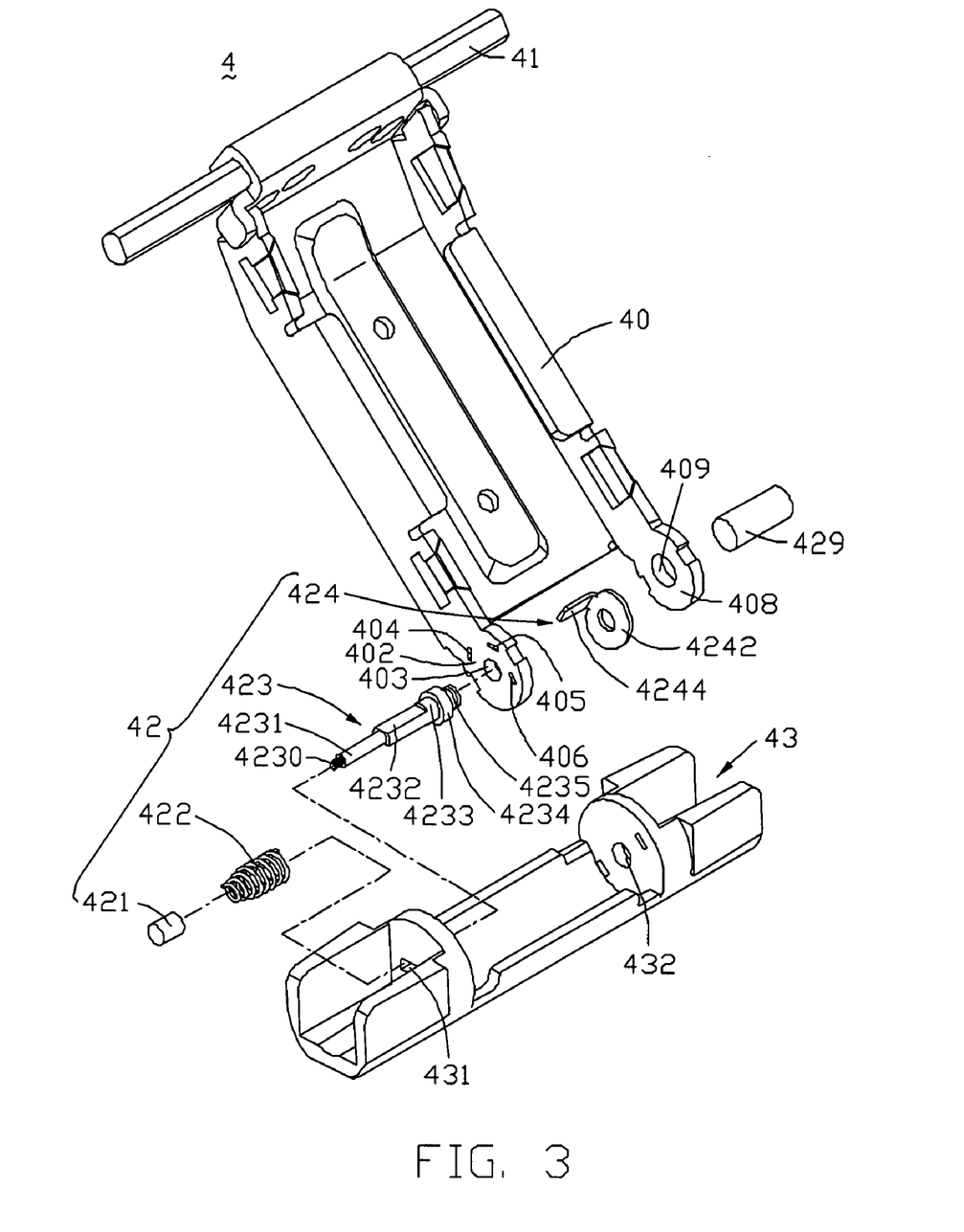
FIG. 3 is an enlarged, exploded view of the neck of FIG. 2, but shown with the housing removed.

Referring also to FIG. 2 and FIG. 3, the neck 4 includes a main body 40, a first pivot 41, a second pivot assembly 42, and a housing 44. As viewed in FIGS. 1-3, the first pivot 41 is located at a top side of the main body 40, and is pivotally connected with the connection arms 205 of the display body 2. The second pivot assembly 42 is located at a bottom side of the main body 40, and is pivotally connected with the feet 6. The housing 44 accommodates the main body 40, the first pivot 41, the second pivot assembly 42, and the supporting body 43.

The second pivot assembly 42 includes a supporting body 43, a pressing button 421, a helical spring 422, a spindle 423, and a locking member 424. The spindle 423 includes a first threaded end 4230, a thin portion 4231, a flattened portion 4232, a thick portion 4233, a stopping portion 4234, and a second threaded end 4235, arranged in that order from left to right. A largest diameter of the flattened portion 4232 is the same as a diameter of the thick portion 4233. The pressing button 421 includes a threaded cavity (not shown) defined therein, and the threaded cavity corresponds to the first threaded end 4230 of the spindle 423. The spring 422 is located around the thin portion 4231 of the spindle 423.

The main body 40 of the neck 4 includes a first ear 402 and a second ear 408 both located at a bottom side thereof. The first ear 402 includes a first through hole 403, a first fixing hole 404, a second fixing hole 405, and a third fixing hole 406 defined therein. The first through hole 403 is defined in a central portion of the first ear 402. A diameter of the first through hole 403 is slightly greater than that of the second threaded end 4235, and less than that of the stopping portion 4234 of the spindle 423. The first fixing hole 404, the second fixing hole 405, and the third fixing hole 406 cooperatively surround almost half of a periphery of the first through hole 403. The first, second and third fixing holes 404, 405, 406 maintain a same distance from the first through hole 403. In the illustrated embodiment, each of the first fixing hole 404, the second fixing hole 405, and the third fixing hole 406 is shaped like a linear slot. The second fixing hole 405 maintains at least a 90-degree angle relative to the first fixing hole 404, measured from a center of the first through hole 403. The third fixing hole 406 maintains about a 135-degree angle relative to the first fixing hole 404, measured from a center of the first through hole 403.

The locking member 424 includes a washer portion 4242, and a fixing tab 4244 perpendicularly extending from an edge of the washer portion 4242. The washer portion 4242 is disc-shaped, and includes a threaded second through hole (not labeled) defined in a central portion thereof. The fixing tab 4244 corresponds to the first fixing hole 404, the second fixing hole 405, and the third fixing hole 406.

The supporting body 43 defines a third through hole 431 and a fourth through hole 432 at opposite sides thereof respectively. The third and fourth through holes 431, 432 are coaxial. The third through hole 431 is shaped like a linear slot. A length of the third through hole 431 is slightly greater than the largest diameter of the flattened portion 4232 of the spindle 423. A transverse width of the third through hole 431 is slightly greater than a distance between two opposite flat sides of the flattened portion 4232 of the spindle 423, and less than the diameter of the thick portion 4233 of the spindle 423. The fourth through hole 432 is circular, and corresponds to both a pivot pin 429 and a fifth through hole 409 defined in the second ear 408.

Each foot 6 is substantially L-shaped, and includes a short arm (not labeled) and a long arm (not labeled) extending perpendicularly from the short arm. The short arm includes a knuckle 60, which corresponds to a respective one of opposite ends (not labeled) of the supporting body 43. When the knuckle 60 is engaged around the corresponding end of the supporting body 43, the foot 6 is pivotally connected with the neck 4. The knuckle 60 of a left one of the feet 6 (as viewed in FIGS. 1-3) includes a sixth through hole 602 defined therein. The sixth through hole 602 corresponds to the pressing button 421 of the second pivot assembly 42. Each of the feet 6 includes a notch 604 defined adjacent to the knuckle 60. The notches 604 of the feet 6 respectively correspond to the first data cable 21 and the second data cable 22.

The flat panel display 1 can be assembled as follows. First, the main body 40 is aligned with the supporting body 43 of the neck 4. The first ear 402 and the second ear 408 of the main body 40 are positioned adjacent to the third through hole 431 and the fourth through hole 432 of the supporting body 43 respectively. The first through hole 403 of the first ear 402 is aligned with the third through hole 431, and the fifth through hole 409 of the second ear 408 is aligned with the fourth through hole 432. Second, the spindle 423 is extended through the first through hole 403 and the third through hole 431. The first threaded end 4230 and the thin portion 4231 are extended through the first through hole 403 and the third through hole 431 in a direction from right to left (as viewed in FIGS. 1-3). Third, the locking member 424 is threadedly engaged to the spindle 423. The washer portion 4242 is threadedly engaged to the second threaded portion 4235 of the spindle 423. Then the flattened portion 4232 and the thick portion 4233 are extended through the first through hole 403 and the third through hole 431 in the right to left direction. Simultaneously, the fixing tab 4244 is extended through and engaged in the third fixing hole 406 of the first ear 402. The stopping portion 4234 is stopped by the first ear 402, because the stopping portion 4234 has a diameter greater than that of the first through hole 403. Thereby, the flattened portion 4232 of the spindle 423 is engaged in the third through hole 431, such that the spindle 423 only rotates in unison with the supporting body 43, even though the flattened portion 4232 is axially slidable in the third through hole 431. Further, the spindle 423 in non-rotatably locked to the first ear 402, by reason of the engagement of the fixing tab 4244 of the locking member 424 in the third fixing hole 406 of the first ear 402.

Fourth, the spring 422 is positioned to surround the first threaded end 4230 and the thin portion 4231 of the spindle 423. Fifth, the pressing button 421 is threadedly engaged to the first threaded end 4230 of the spindle 423. Thereby, the spring 422 is slightly compressed between the pressing button 421 and the corresponding end of the supporting body 43. Sixth, the pivot pin 429 is extended through the fifth through hole 409 and the fourth through hole 432. Seventh, the neck 4 is pivotally engaged to the feet 6. The knuckle 60 of the left foot 6 is attached around the corresponding end of the supporting body 43. Thus the pressing button 421 protrudes out leftward from the sixth through hole 602. The knuckle 60 of a right one of the feet 6 is attached around the corresponding end of the supporting body 43. The pivot pin 429 is extended through a through hole of the knuckle 60 of the right foot 6, so that the pivot pin 429 protrudes out rightward from such through hole. Eighth, the housing 44 is assembled to the main body 40 of the neck 4. Finally, the first pivot 41 is pivotally engaged to the connection arms 205 of the display body 2.

Figure 4:
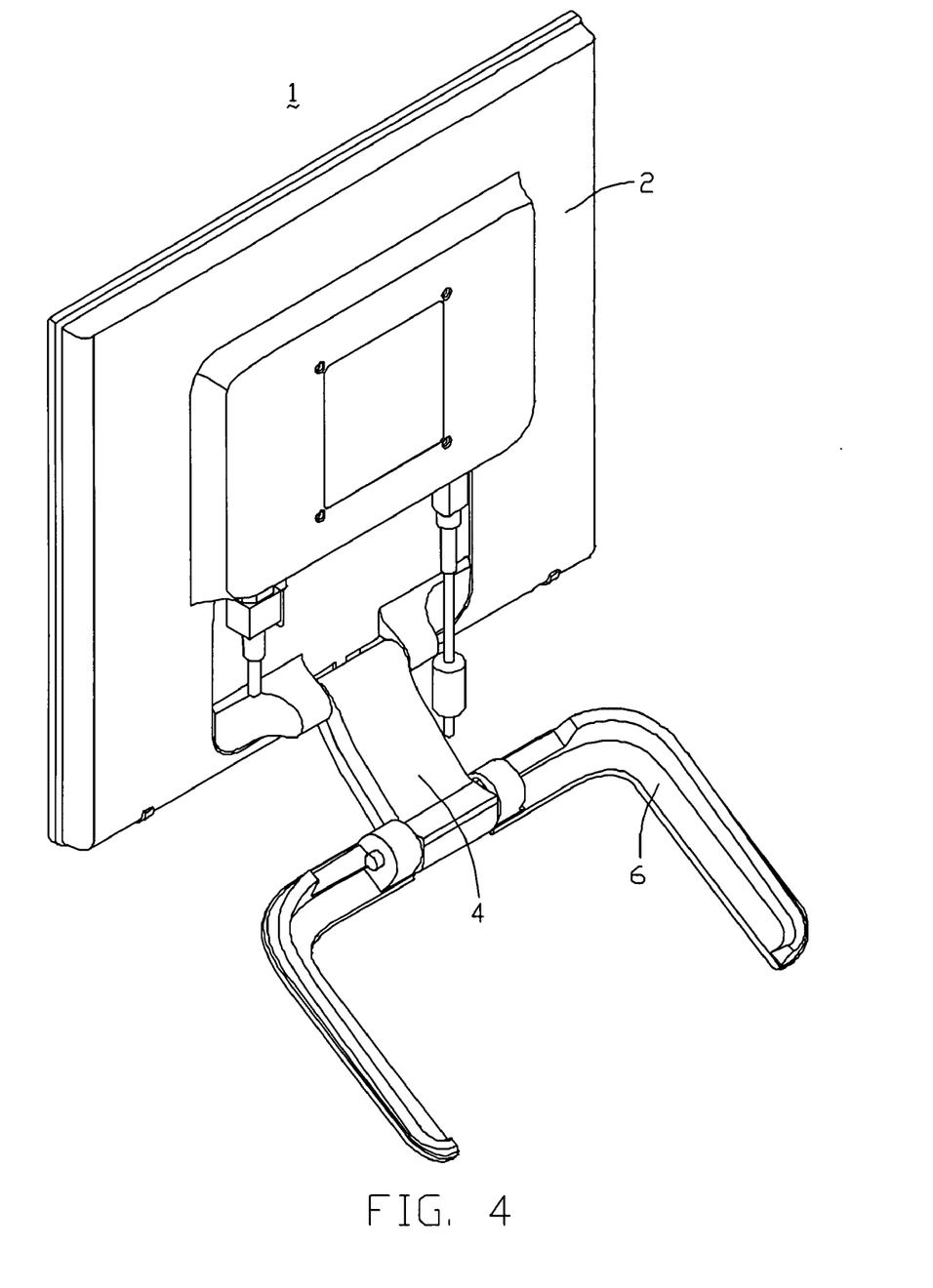
FIG. 4 is similar to FIG. 1, but showing the feet rotated away from the display body.
Figure 5:
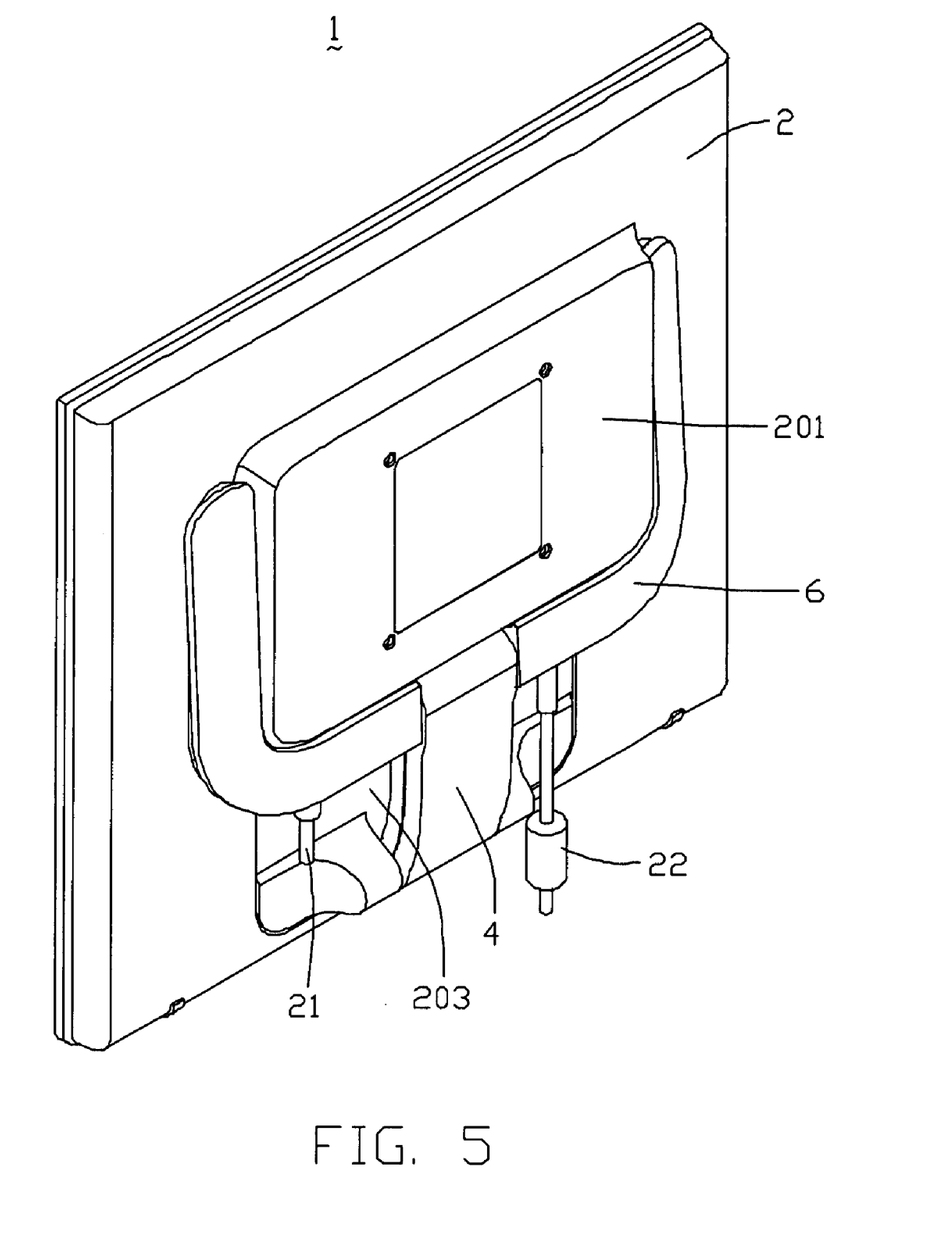
FIG. 5 is similar to FIG. 4, but showing the neck and the feet rotated to be adjacent to the display body.

Referring to FIG. 1, once the flat panel display 1 has been assembled as described above, the fixing tab 4244 is engaged in the third fixing hole 406. The feet 6 and the neck 4 cooperatively support the display body 2, which is oriented at a first predetermined angle for viewing by a user. In the illustrated embodiment, the display body 2 is oriented substantially perpendicular to the feet 6. When the pressing button 421 is pressed inward, the spring 422 is compressed. The pressing button 421 is pressed until the fixing tab 4244 is released from the third fixing hole 406. Thereby, the supporting body 43 engaged to the feet 6 can be pivoted relative to the main body 40 of the neck 4. A user can rotate the feet 6 (about 135°) until the fixing tab 4244 reaches the first fixing hole 404. Then the pressing button 421 is released, the spring 422 decompresses, and the fixing tab 4244 engages in the first fixing hole 404. Thus the flat panel display 1 is brought to the position shown in FIG. 4. Then the neck 4 can be rotated about the first pivot 41 in order to fold up the flat panel display 1. This brings the flat panel display 1 to the folded up position shown in FIG. 5. The feet 6 are positioned around the protruding portion 201 and fittingly abut the back cover 20 of the display body 2. In particular, the long arms of the feet 6 are respectively adjacent to two vertical sides (not labeled) of the protruding portion 201, and the short arms of the feet 6 are respectively adjacent to a horizontal bottom side (not labeled) of the protruding portion 201. Further, the neck 4 is partially accommodated in the recessed portion 203 of the back cover 20, with the end of the neck 6 having the supporting body 43 being adjacent to the horizontal bottom side of the protruding portion 201. Therefore, the flat panel display 1 can achieve a desired flat, compact shape.

Figure 6:
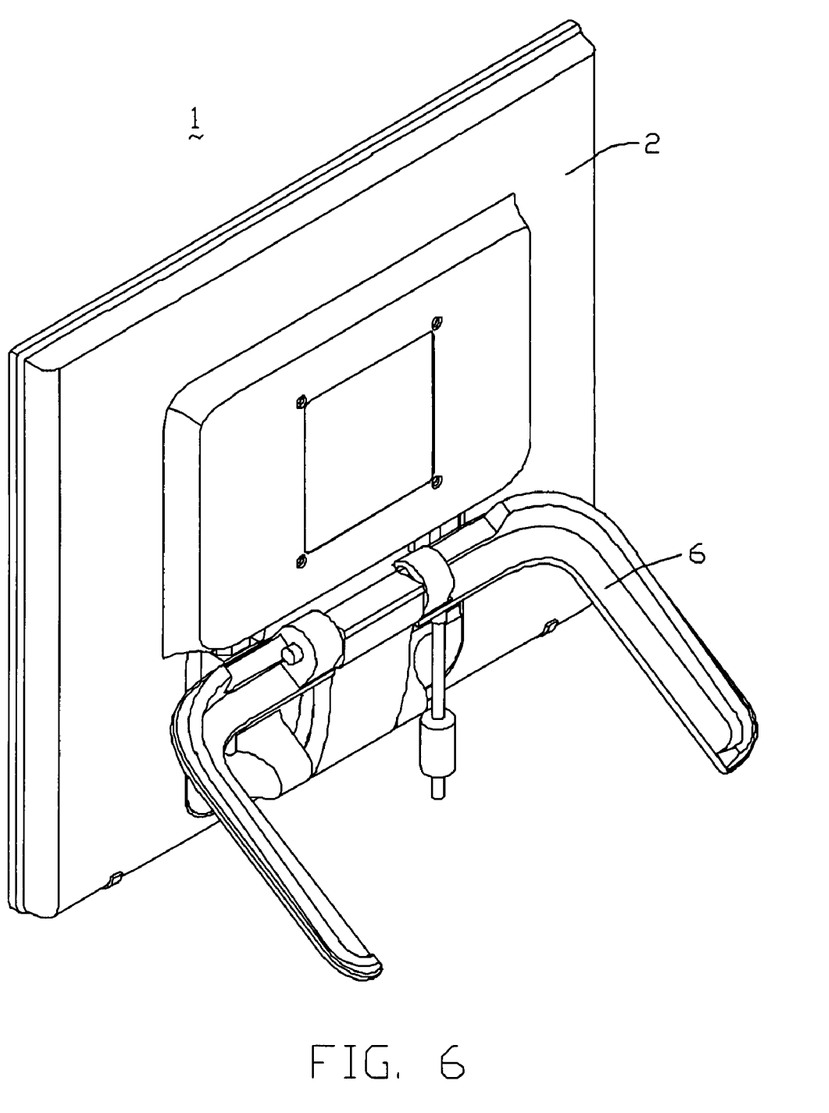
FIG. 6 is similar to FIG. 5, but showing the neck and the feet rotated away from the display body, whereby the display is oriented at a second angle for viewing.

From the folded up position, the pressing button 421 can be pressed inward until the fixing tab 4244 is released from the first fixing hole 404. The feet 6 can then be rotated (about 90° or more) in a direction away from the back cover 20 until the fixing tab 4244 is engaged in the second fixing hole 405. This brings the flat panel display 1 to the position shown in FIG. 6. In this position, the display body 2 and free ends of the long arms of the feet 6 can be stood on a supporting surface such as a table or desk. Thus, the display body 2 provides a second predetermined angle for viewing by a user.

In summary, the flat panel display 1 can provide the two predetermined angles for viewing when the fixing tab 4244 is engaged in the third fixing hole 406 or the second fixing hole 405 respectively. Further, when the flat panel display 1 is folded up, the neck 4 is partially accommodated in the recessed portion 203 of the back cover 20, and a remaining part of the neck 4 does not protrude further than the protruding portion 201 of the back cover 20. The feet 6 are positioned around the protruding portion 201, and do not protrude further than the protruding portion 201 of the back cover 20. The feet 6 can be securely maintained relative to the neck 4 in the folded up position by the engagement of the fixing tab 4244 in the first fixing hole 404. Thus, the flat panel display 1 advantageously achieves a very flat, compact, and stable shape. This helps to economize on the cost of packaging and transporting the flat panel display 1.

Further or alternative embodiments may include the following. In one example, the flat panel display 1 may include only one foot pivotally connected with the neck 4. In such case, the foot may be frame-shaped. In another example, the back cover 20 may include only the recessed portion 203 defined therein. In such case, the neck 4 and the feet 6 may be partially or even fully accommodated in the recessed portion 203.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A flat panel display comprising:
a display body comprising a back cover, the back cover comprising:
a protruding portion; and
a recessed portion adjacent to the protruding portion;
a neck connected with the display body by a pivot, the neck comprising a main body and corresponding to the recessed portion, the main body comprising at least one ear, at least one of the at least one ear having a first through hole defined therein; and
at least one foot connected with the neck by a pivot assembly, the at least one foot supporting the neck and the display body, and corresponding to the protruding portion, the pivot assembly comprising a supporting body pivotally connected with the main body;
wherein said at least one of the at least one ear of the main body further has a first fixing hole, a second fixing hole, and a third fixing hole defined therein, and the first, second, and third fixing holes are generally arranged along an imaginary arc that surrounds less than half of a periphery of the first through hole; and
when the flat panel display is folded up, the neck is at least partially accommodated in the recessed portion, and the at least one foot is positioned adjacent a peripheral edge of the protruding portion.

2. The flat panel display as claimed in claim 1, wherein the supporting body comprises a second through hole defined therein, and the second through hole corresponds to the first through hole.

3. The flat panel display as claimed in claim 2, wherein the pivot assembly further comprises a spindle extending through the first Through hole and the second through hale.

4. The flat panel display as claimed in claim 3, wherein the spindle comprises a keyed first portion, the second through hole has a keyed configuration, and the keyed first portion is received in the second through hole such that the keyed first portion is non-rotatable relative to the supporting body.

5. The flat panel display as claimed in claim 4, wherein the spindle further comprises a second portion adjacent to the keyed first portion and the second portion is received in the first through hole such that the second portion is rotatable relative to said at least one of the at least one ear.

6. The flat panel display as claimed in claim 5, wherein the spindle further comprises a stopping portion adjacent to the second portion and spaced from the keyed first portion, wherein a diameter of the stopping portion is greater than a diameter of the first through hole.

7. The flat panel display as claimed in claim 4, wherein the pivot assembly farther comprises a pressing button, which is fixed to an end of the spindle farthest from the stopping portion.

8. The flat panel display as claimed in claim 7, wherein the pivot assembly further comprises a helical spring located between the pressing button and said at least one of the at least one ear.

9. The flat panel display as claimed in claim 1, wherein the pivot assembly further comprises a locking member fixed to the spindle and rotatable in unison with the spindle.

10. The flat panel display as claimed in claim 9, wherein the locking member comprises a fixing tab configured to slidingly engage in any one of the first fixing hole, the second fixing hole, and the third fixing hole.

11. The flat panel display as claimed in claim 1, wherein each of the first fixing hole, the second fixing hole, and the third fixing hole maintains a same distance from the first through hole.

12. The flat panel display as claimed in claim 11, wherein the third fixing hole maintains approximately a 135-degree angle relative to the first fixing hole, and the second fixing hole maintains at least a 90-degree angle relative to the second fixing hole.

13. The flat panel display as claimed in claim 1, wherein the display body further comprises at least one connection arm, and the pivot is connected with the display body by the at least one connection arm such that the neck is rotatable relative to the display body.

14. The flat panel display as claimed in claim 1, further comprising at least one data cable extending into the display body.

15. The flat panel display as claimed in claim 14, wherein the at least one foot comprises a notch corresponding to the at least one data cable.

* * * * *